US008659667B2

(12) United States Patent
Syed et al.

(10) Patent No.: US 8,659,667 B2
(45) Date of Patent: Feb. 25, 2014

(54) RECIPE BASED REAL-TIME ASSISTANCE FOR DIGITAL IMAGE CAPTURE AND OTHER CONSUMER ELECTRONICS DEVICES

(75) Inventors: Zia Syed, San Jose, CA (US); Woosuk Chang, Cupertino, CA (US)

(73) Assignee: Panasonic Corporation, Osaka (JP)

( * ) Notice: Subject to any disclaimer, the term of this patent is extended or adjusted under 35 U.S.C. 154(b) by 176 days.

(21) Appl. No.: 13/220,253

(22) Filed: Aug. 29, 2011

(65) Prior Publication Data

US 2013/0050507 A1 Feb. 28, 2013

(51) Int. Cl.
H04N 5/225 (2006.01)
H04N 5/222 (2006.01)
H04N 5/235 (2006.01)

(52) U.S. Cl.
USPC ............ 348/207.1; 348/207.11; 348/333.02; 348/362

(58) Field of Classification Search
None
See application file for complete search history.

(56) References Cited

U.S. PATENT DOCUMENTS

| 7,317,485 | B1* | 1/2008 | Miyake et al. | 348/333.02 |
| 7,362,354 | B2* | 4/2008 | Lin | 348/222.1 |
| 7,616,248 | B2* | 11/2009 | Parulski et al. | 348/333.11 |
| 2009/0231441 | A1* | 9/2009 | Walker et al. | 348/207.1 |
| 2011/0105152 | A1* | 5/2011 | Yu et al. | 455/456.3 |
| 2011/0285811 | A1* | 11/2011 | Langlotz et al. | 348/37 |
| 2012/0293687 | A1* | 11/2012 | Karn et al. | 348/231.99 |

* cited by examiner

Primary Examiner — Lin Ye
Assistant Examiner — John H Morehead, III
(74) Attorney, Agent, or Firm — Harness, Dickey & Pierce, P.L.C.

(57) ABSTRACT

A processor within a digital camera which generates and utilizes a recipe data file and communicates with a network-based storage location for uploading and downloading. The recipe data file contains both a device setting template component, used to set camera-specific parameters, and an instructional component, which the processor uses to generate visual and audible instructions for positioning and aiming the camera. Visual instructions are provided directly on the viewfinder display. The processor uses on-board GPS and compass or gyroscope to obtain real-time position and pointing direction of the camera.

42 Claims, 6 Drawing Sheets

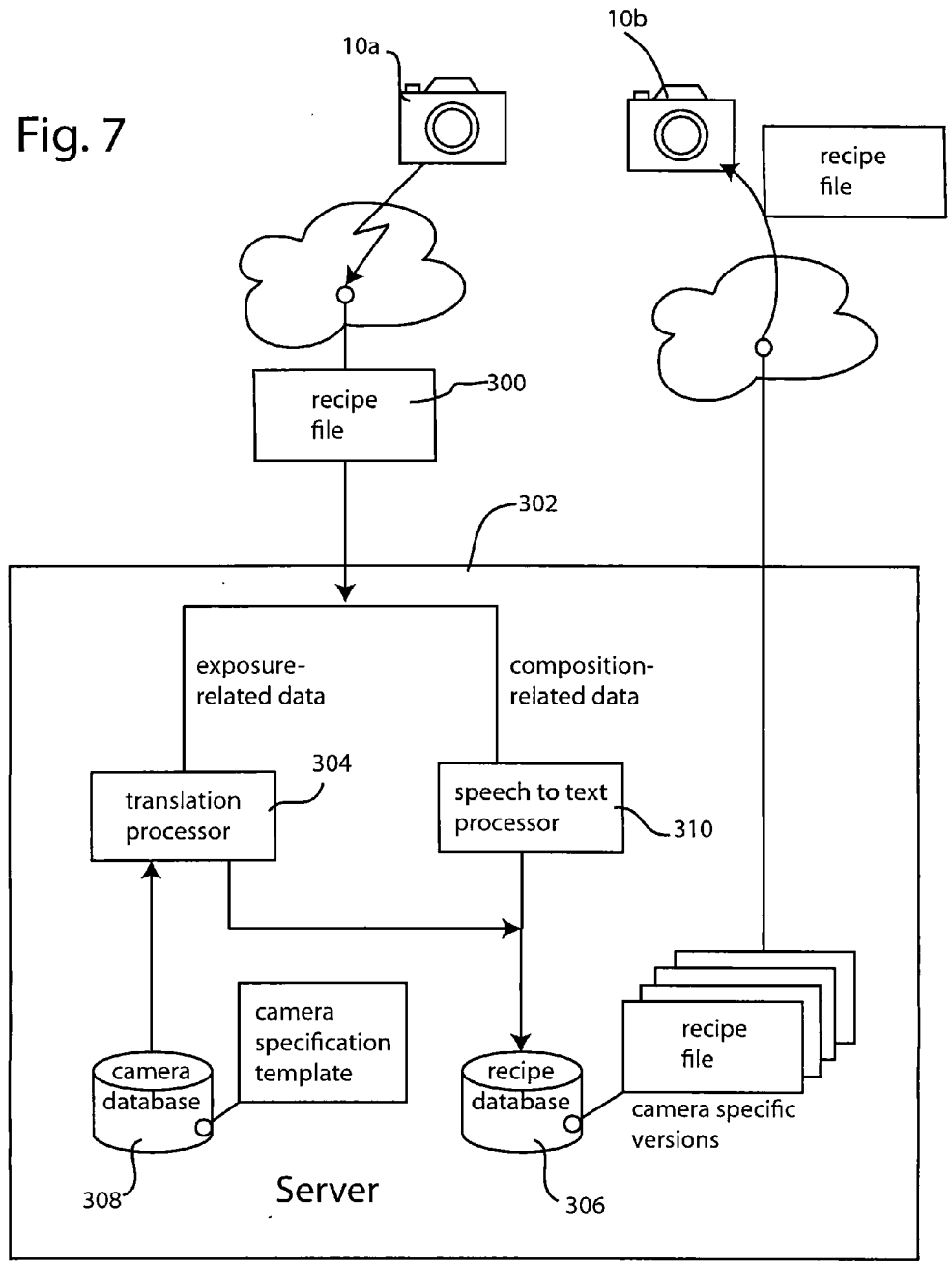

RECIPE BASED REAL-TIME ASSISTANCE FOR DIGITAL IMAGE CAPTURE AND OTHER CONSUMER ELECTRONICS DEVICES

FIELD

The present disclosure relates generally to digital cameras and consumer electronic devices. More particularly, the disclosure relates to a processor-implemented, recipe based assistance tool for providing real-time instruction in the use of the camera or device as supplied by other users via networked communication. In one embodiment, the recipe based assistance tool provides real-time instruction in how to capture an image based on a recipe posted by another on a social network.

BACKGROUND

Photography is an art. The current trend in digital imaging devices allows for adjusting technical aspects of digital images, like image processing and manipulation in real-time. The processing is primarily done on the captured image on the device, pre or post storage. However, a "best shot" image is more than just the band of pixel data and color gradients. It's the combination of positioning of a camera, envisioning artistic perspective to the subject, along with the lighting effect captured at the "right moment".

At present, the technology allows for users to share their digital images, the end results of their artistic endeavor, with the rest of the world, but now "how" they captured that shot. The metadata captured in the digital images are all image related, for example, focus and exposure settings, etc., and not scene related.

SUMMARY

The recipe based assistance tool disclosed here, which may be incorporated into a digital camera, allows a first user to capture a shot along with the context of the scene. The tool then creates a "recipe" for that particular photograph, which along with the captured digital image can be uploaded or posted to a social network or on-line store where the uploaded recipe can be accessed by others who wish to learn how the posted image was made. In one embodiment, real-time instructions are provided to the user of the camera through audio-video instruction played through the camera's viewfinder display and associated sound or annunciation system.

To create the recipe the digital camera includes a digital image capturing system having an image sensor that defines a focal plane and having at least one exposure adjusting mechanism that stores an associated device setting value in a processor-readable non-transitory memory and having a release mechanism that captures an image to the image sensor in response to user manipulation. A camera location sensor provides location data indicative of the position of the camera relative to a predetermined reference frame. A camera pointing direction sensor provides data indicative of the orientation of the focal plane relative to a predetermined reference frame.

The camera includes a recipe based assistance tool comprising a recipe generating processor that reads the device setting value, the location data and the direction data, and generates a recipe data file in response to manipulation of the release mechanism; and a network communication device adapted to upload the recipe data file to a network-based storage location for download by others.

To utilize the previously created recipe, the recipe based assistance tool includes a recipe utilizing processor that reads the recipe data file and uses information contained within said file to adjust the device setting value. The recipe utilizing processor is further operative to use information contained within the file to compare with the location data and the direction data and to generate an instructional message to the user.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 7 is a server network diagram illustrating server-side processes performed upon the recipe files.

DETAILED DESCRIPTION

Example embodiments will now be described more fully with reference to the accompanying drawings.

The recipe based assistance tool described here is deployed within a digital camera, although it will be understood that there are other consumer electronic products that will also benefit from the inclusion of the recipe based assistance tool. Examples include video cameras, 3D cameras, surveillance cameras, and other products where learning to use the product creatively extends beyond merely mastering the basic features and operations taught in the operation manual.

Figures 1A, 1B:
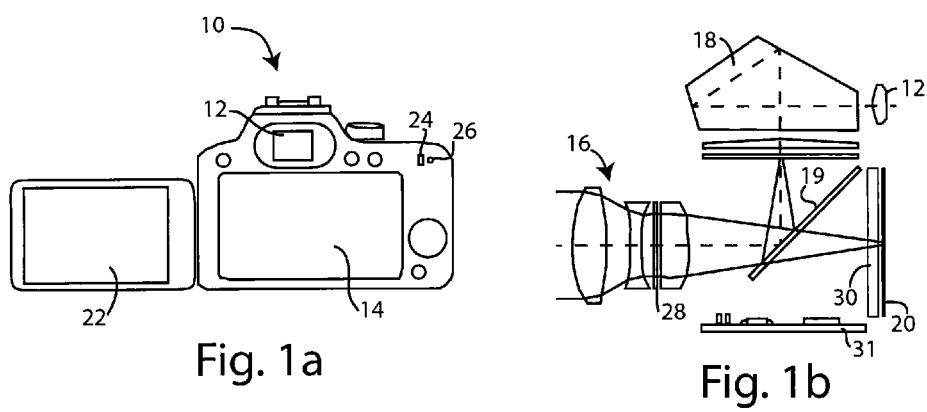
FIGS. 1a and 1b are exemplary views of a digital camera into which the recipe based assistance tool is incorporated, FIG. 1a being a rear view of the camera and FIG. 1b being a cross-sectional side view.

An exemplary digital camera has been illustrated in FIGS. 1a and 1b. FIG. 1a shows the camera from the rear side, as the user would see it during use. In the embodiment featured here, the camera 10 includes an optical viewfinder 12 and an LCD display panel viewfinder 14. Looking through the optical viewfinder 12, the user sees the image captured through the camera primary lens system, if the camera is of single lens reflex type, or through a secondary viewfinder lens system, if the camera is of the rangefinder type. The camera illustrated in FIGS. 1a and 1b is of the single lens reflex type. Thus the image provided through the optical viewfinder 12 is captured by the primary lens system 16 (FIG. 1b) and is then directed to the viewfinder 12 through the internal pentaprism 18. Thus the user is viewing a mirror-reflected sample of the same optical image that will illuminate the image sensor 20. The mirror 19, which is partially mirrored and allows light to also fall on the sensor 20, flips up moments before the shot is taken allowing the sensor to receive unimpeded illumination.

The display panel viewfinder 14 is coupled to the image sensor and provides a display of the image as captured and interpreted by the image sensor. Whereas the optical viewfinder provides a view of the light incoming from the scene, the display panel viewfinder provides a view of the effect produced by capturing the incoming light in the image sensor. The photographer can use either optical viewfinder or display panel viewfinder to compose the image for capture.

The recipe based assistance tool uses the camera's viewfinder system to provide visual, recipe-based instructions to the user. In this regard, the display panel viewfinder 14 may be used as a video playback display for this purpose. Typically, the optical viewfinder 12 will not have video playback capabilities, although such can be added by projecting the video playback information onto the pentaprism in heads-up display fashion.

Some digital cameras may be provided with an auxiliary digital display such as the flip out display 22 shown. If provided, the flip out display 22 can serve as the video playback display for recipe-based instruction, leaving the main display panel viewfinder 14 uncluttered by instructional information.

The camera 10 also includes an audio system for annunciation purposes. In a typical camera, such annunciation may be limited to emitting message beeps to alert the user to certain operating conditions. In the preferred embodiment, the audio system is enhanced to include a small audio speaker 24 with associated audio amplifier capable of reproducing audio frequencies covering the normal human speech range. To capture verbal instructions from a user when creating a new recipe, camera 10 includes a small microphone 26.

Associated with the camera's primary lens system 16 is an adjustable aperture mechanism 28. The aperture mechanism is controlled electronically by the camera CPU, either in response to user control or automatically based on exposure requirements, to adjust the size of the aperture or pupil through which light entering the primary lens system 16 is admitted. Typically measured in increments of f-stops, the aperture setting thus controls how much light is projected onto the image sensor during a given time interval.

While the aperture mechanism controls the amount of light projected onto the image sensor, it is the shutter mechanism 30 that controls the duration of the time interval during which the image sensor is exposed to capture a given image. The shutter mechanism operates by momentarily opening a system to admit light onto the image sensor and then closing that system to block further light from reaching the sensor. Like the aperture mechanism, the shutter mechanism is also controlled electronically by the camera CPU, either in response to user control or automatically based on exposure requirements. The shutter mechanism settings are measured in time intervals, typically in seconds or fractions of a second. The recipe based assistance tool is preferably embedded within the electronic circuitry 31 used to implement the digital camera functions.

Before presenting a detailed description of the functional components of the electronics used to implement the recipe based assistance tool, an overview of its basic functionality will be presented, namely, how recipes are created and how recipes are thereafter used.

Figure 2:
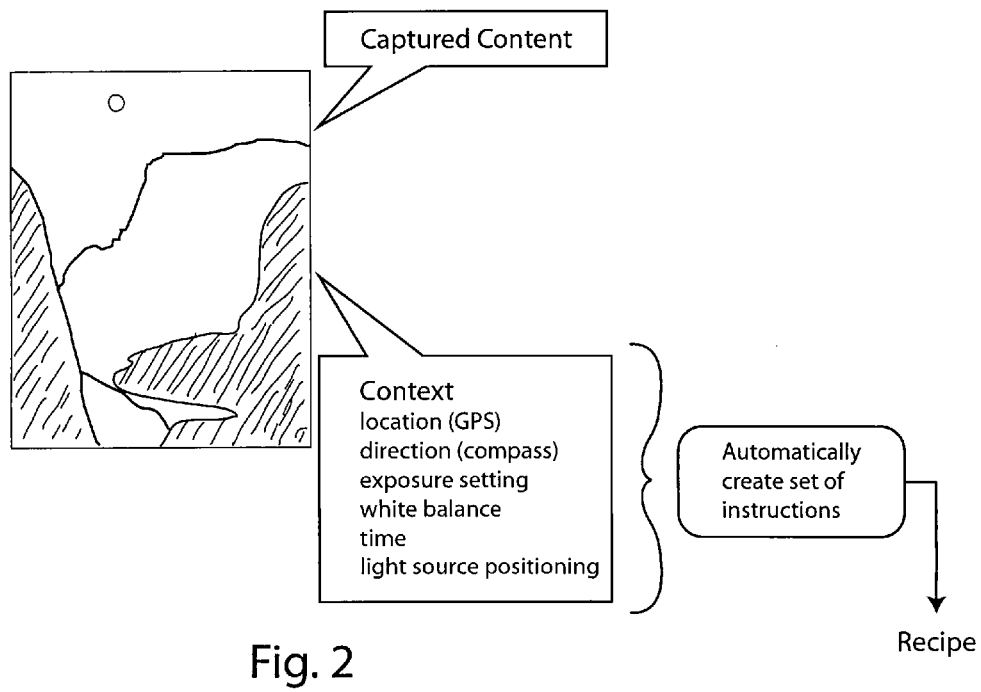
FIG. 2 is a graphical depiction illustrating use of the recipe based assistance tool to automatically capture content and context information and thereby generate a set of recipe data.

As shown in FIG. 2, the assistance tool enables any user of a suitably equipped camera to create and upload recipe data files. While the quality of the recipe will depend on the artistic skill of the recipe creator, the recipe based assistance tool is not limited to use by experts. Anyone can create a recipe and share it with others over the network.

A recipe is a digital data file containing information that the processor or CPU of the camera uses to make necessary camera settings and to instruct the user in how to compose and capture an image, using the artistic knowledge and skill of the recipe's creator as a guide. The recipe data file comprises two components, a template component describing device settings, and an instructions component describing actions that the user needs to perform. Recipe data files are created as a natural extension of using a camera that is equipped with the recipe based assistance tool.

As illustrated in FIG. 2, the recipe creator uses the suitably equipped camera to compose and capture an image, in this case an image of Half Dome in Yosemite National Park. The recipe creator is a skilled photographer who has identified a photogenic vantage point for capturing the image, and who has waited at the site until the sunlight lights up Half Dome while placing certain foreground terrain in partial shadow to create a dramatic composition. Our photographer has chosen a particular season when the moon can be seen rising in the background of the composition.

By pressing the camera's shutter release button in the usual fashion, the digital camera captures the image and stores that image as captured content. Depending on the camera's settings, this captured content may be stored in a standardized RAW format, or a standardized JPEG format, or both. In addition to the captured content, the recipe based assistance tool incorporated into the camera captures context data that is used to automatically generate a set device data (metadata about how the creator adjusted the camera settings when capturing the shot) and a set of instruction data explaining how the shot was composed and taken. This context data include location (GPS), direction (compass), exposure setting, white balance, time-of-day, light source positioning, and the like. The recipe based assistance tool automatically creates a set of instructions that along with the device settings become a recipe data file which can then be uploaded to a server, such as a cloud-based server, for sharing with others. The recipe based assistance tool within the camera bundles the context data with the captured content data and uploads both to the server.

Figure 3:
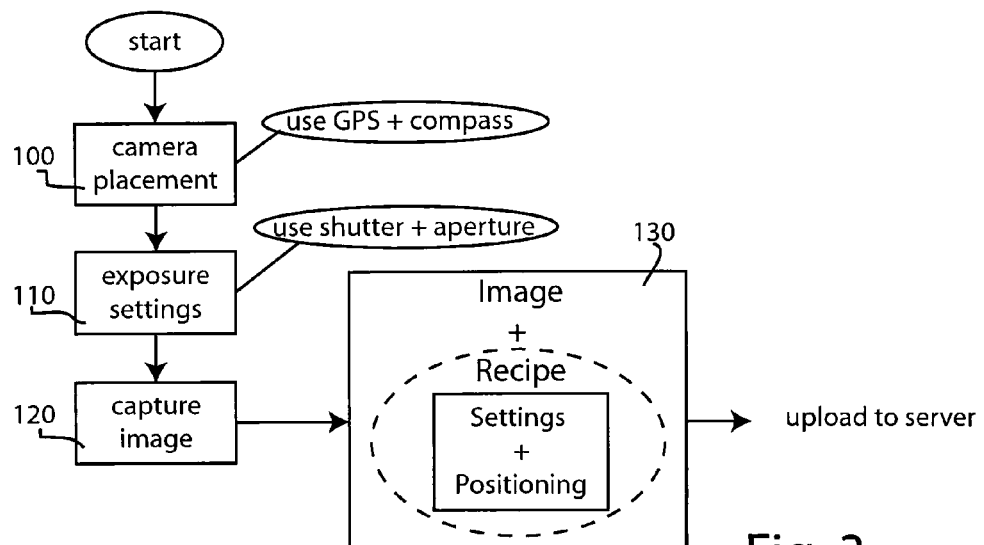
FIG. 3 is a use case flow diagram illustrating how the recipe based assistance tool is used to capture context and content and upload these data to a server as associated image and recipe data.

FIG. 3 summarizes the process by which context and content are captured. During camera placement and shot composition (step 100), the recipe based assistance tool uses data from GPS and electronic compass preferably disposed within the camera to gather some of the context data. Then as the creator makes settings on the camera (step 110), such as setting the shutter speed and aperture, the recipe based assistance tool captures these data as part of the context data as well. By pressing the shutter release button, the camera captures the image in the usual fashion (step 120). At this same instant, the recipe based assistance tool records the context data in memory. Thereafter, the recipe based assistance tool bundles context and content information into a data file, as illustrated at 130. The data file 130 includes the image data and recipe data. The recipe data, in turn, comprise camera settings data and camera positioning data. The data file 130 is then uploaded to a server by the recipe based assistance tool.

Figure 4:
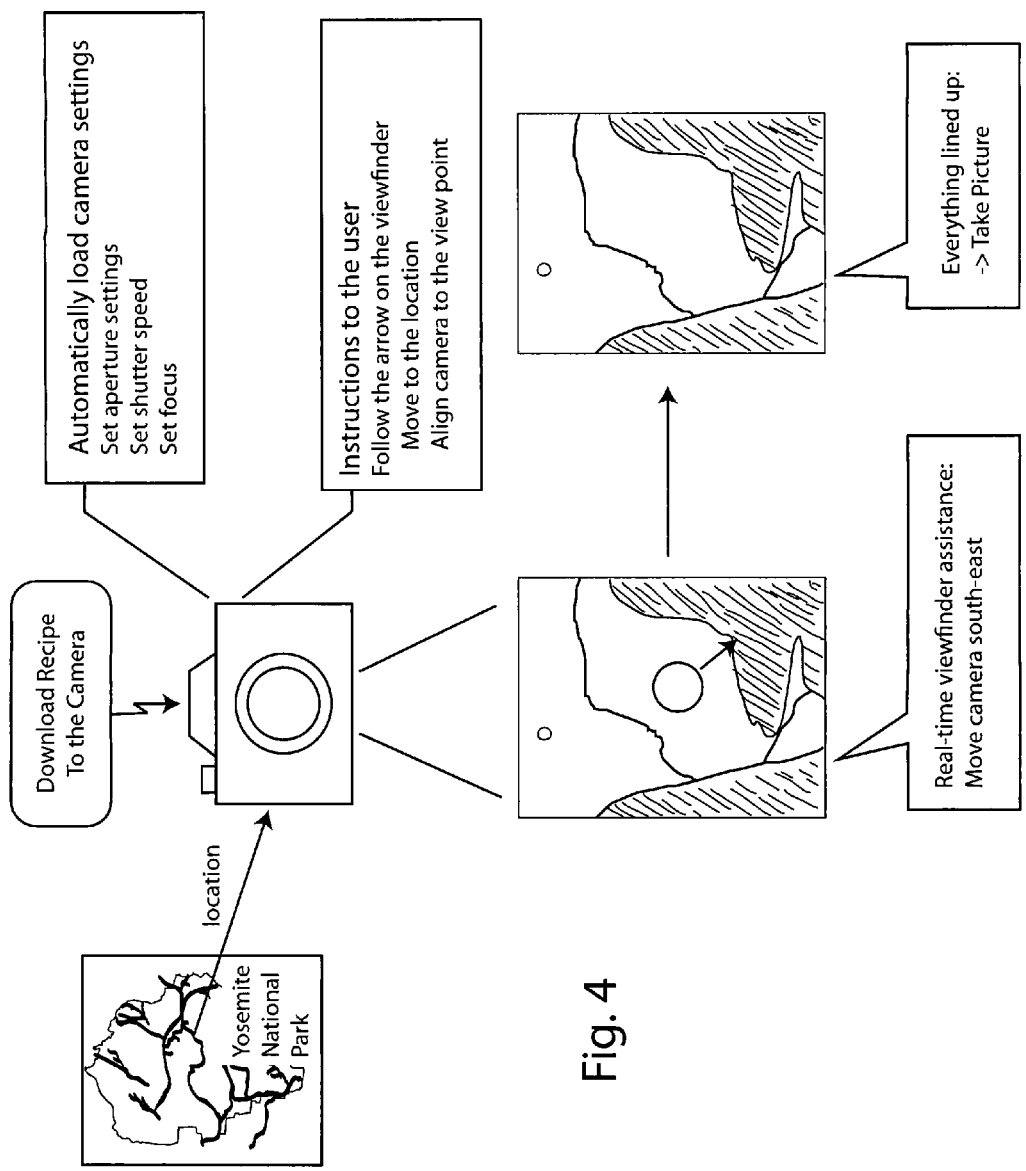
FIG. 4 is a graphical depiction illustrating use of the recipe based assistance tool in the process for using the set of recipe data to provide instruction to the camera user via the camera's audio-video interface.

Having uploaded the recipe data file for the Half Dome image, another user can utilize the recipe to compose and capture his or her own image of Half Dome, as illustrated in FIG. 4. Although the operation may vary, in this case the user arrives at Yosemite National Park and wishes to take some memorable photographs. Using the recipe based assistance tool, the user employs his or her camera to search the networked data store for candidate recipes in the Yosemite park area. Because the camera is equipped with GPS, the search can automatically search the Yosemite National Park area, simply because the camera is now located in the park.

The user browses through a series of thumbnail photographs offered on the networked data store and selects the image of Half Dome discussed above. By selecting this image, the recipe based assistance tool downloads the associated recipe data file to the camera and the tool then automatically loads the camera settings required to reproduce the shot. The recipe based assistance tool thus sets the aperture, shutter speed, focus and other settings, as called for by the device settings template component of the recipe data file.

Setting the camera to match those used by the recipe's creator is only half of the creative task, however. In addition to making the device settings, the user must now also compose the shot by locating the proper vantage point, pointing the camera in the proper direction, and considering other factors which the recipe's creator had considered when the original shot was taken. Indeed, much of the artistry in making a beautiful photograph involves finding the right vantage point, the right camera angle, the right lighting and the right overall composition. Novice users and even experienced technicians often find this aspect of photography most difficult.

Fortunately, the recipe based assistance tool assists the user in composing the shot by providing instructions to the user either by on-screen instructions displayed on the viewfinder, or by audible instructions, or both. In the illustrated example of FIG. 4, the user has used the GPS within the camera to walk to the location specified (the vantage point where the original creator stood). The user is then instructed to point the camera in the southeasterly direction (using the compass within the camera as a guide). The recipe based assistance tool provides real-time viewfinder assistance by displaying on-screen arrows in the viewfinder to show which direction to move the camera until the proper composition is established. Once everything is lined up to match the recipe, the tool issues an instruction to the user that he or she may now take the picture.

Of course, the user is not slavishly constrained to take the exact picture specified by the recipe. The recipe may be used as a guide or learning tool. Once the recipe-based composition is explored, the user may discover other pleasing shots to take in addition to or instead of the one taught by the recipe.

Figure 5:
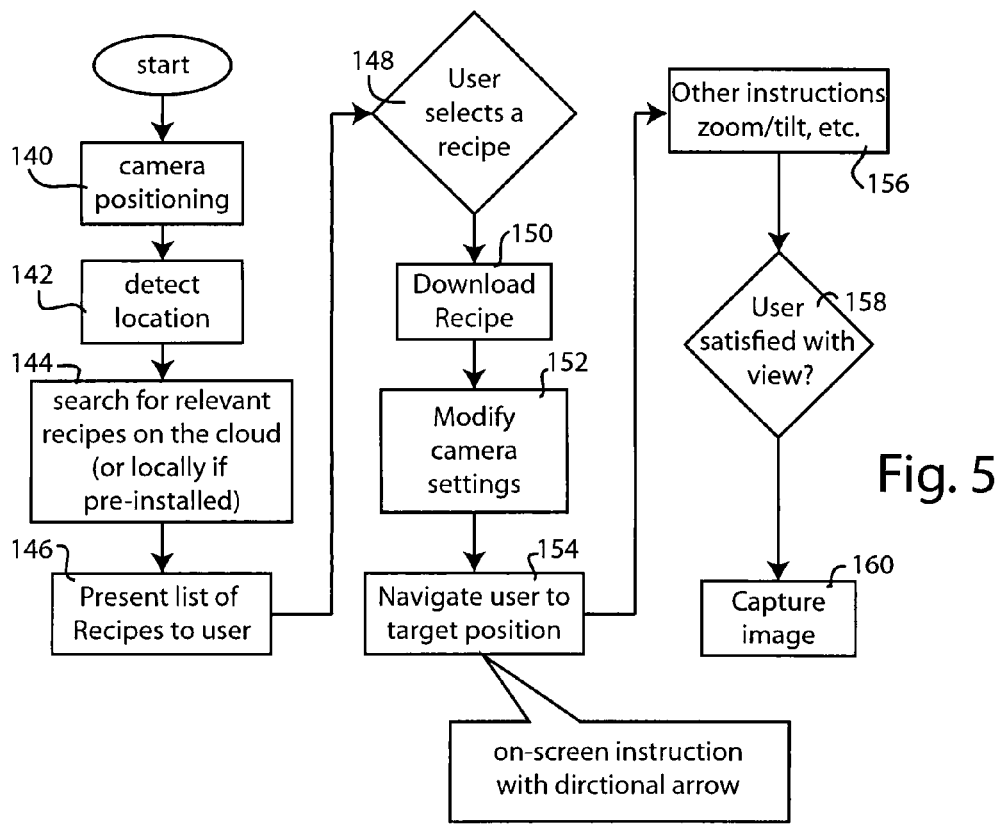
FIG. 5 is a use case flow diagram illustrating how the recipe data can be used to guide a user in capturing an image by following on-screen instruction provided via the camera's audio-video interface.

FIG. 5 summarizes an exemplary recipe use case that generally corresponds to the foregoing example. The process begins with the user turning on the camera so that the recipe based assistance tool activates the GPS. As the user carries the camera to a desired location (step 140), the tool uses the GPS to detect the camera location (step 142). The user then searches for relevant recipes on a network-based or cloud-based resource, or references locally stored recipes if such have been previously downloaded and installed (step 144). The recipe based assistance tool presents a list of recipes to the user (step 146) which may include presenting digital image thumbnail images associated with the recipe files.

The user then selects a desired recipe by interacting with a menu items from the presented list (step 148) and the selected recipe is downloaded (step 150). The recipe based assistance tool modifies the camera settings (step 152) and proceeds to instruct the user in how to navigate to the target position (step 154). If other instructions are required by the recipe, such as setting the zoom or tilt angle of the camera lens, the assistance tool instructs the user to perform these adjustments (step 156), providing on-screen instructions with directional arrows. Once the user is satisfied with the view (step 158), he or she presses the shutter release button to capture the image (step 160).

Figure 6:
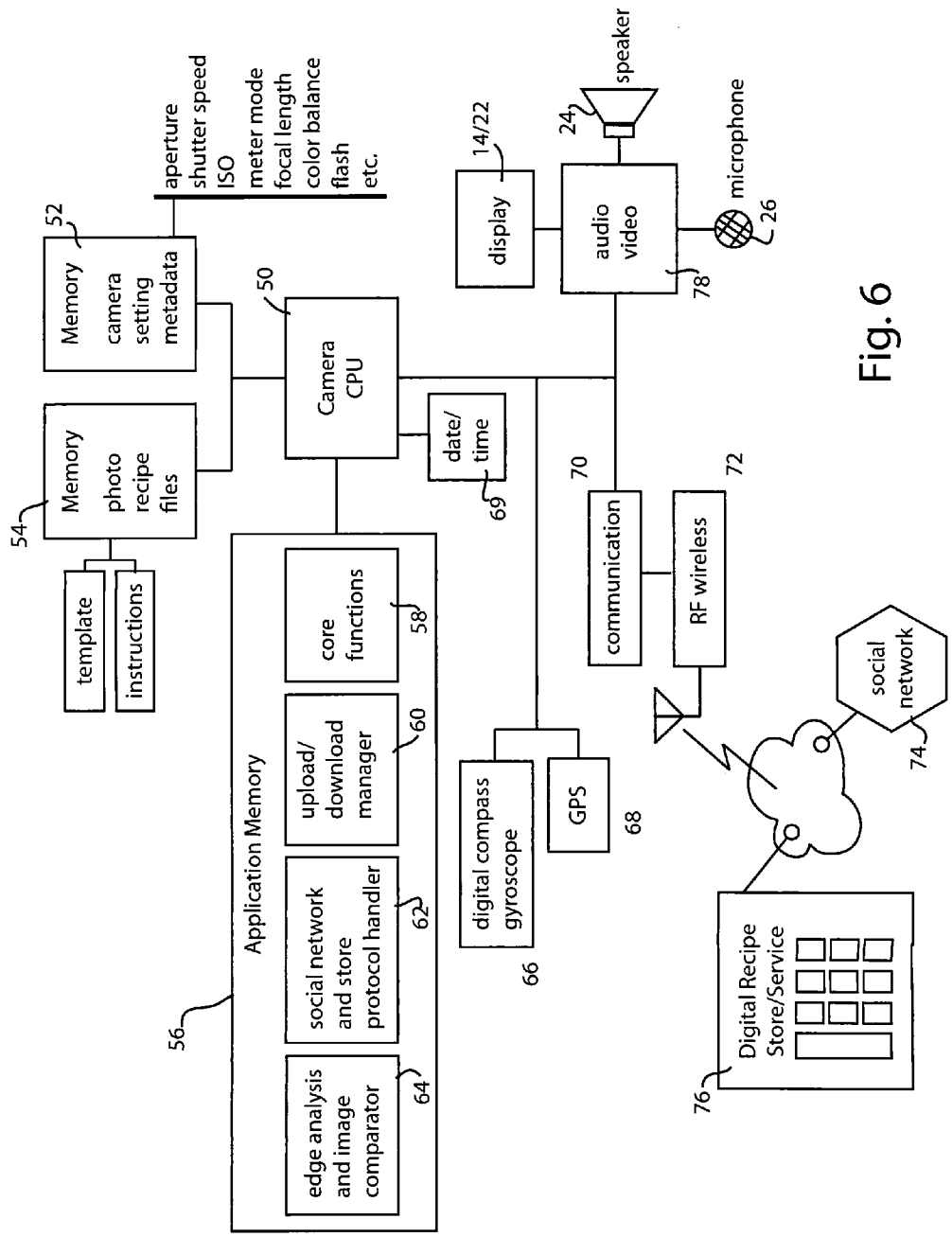
FIG. 6 is an electronic system block diagram of the processor-implemented components and associated electronic systems of an embodiment of the recipe based assistance tool.

Referring to FIG. 6, a block diagram of an embodiment of the recipe based assistance tool is illustrated. Although different processors may be used, the illustrated embodiment uses the camera CPU 50 as the primary processor used to implement the assistance tool. In FIG. 6, some of the standard camera interface components coupled to camera CPU 50 have not been illustrated to simplify the description.

Camera CPU 50 is coupled to read and/or write to digital memory, both to store the operating instructions used by the CPU and to store and access data files used to implement the basic camera functions and, in this embodiment, also used to store and access data files used to implement the recipe based assistance tool. Thus, as shown in FIG. 6, camera CPU 50 is coupled to memory 52 where camera setting metadata are stored. Examples of such metadata include aperture (f-stop), shutter speed, ISO, meter mode, lens focal length, color balance (color temperature), flash mode, and so forth. These metadata are typically written to memory 52 by camera CPU 50 in association with each digital image captured.

Also coupled to CPU 50 is memory 54 where photo recipe data files are stored. As previously discussed, these recipe data files comprise a template component corresponding to camera device settings and an instructions component corresponding to actions describing how to position and aim the camera within the physical environment in order to capture the desired image. Data values for the template component correspond, for the most part, to camera setting metadata values stored in memory 52, or a subset thereof. The template component values differ from the metadata stored in memory 52 in that the template values represent recipe settings obtained by downloading a recipe file from a source, such as from a social networking site or from an on-line store. In this regard, access to recipe data files can be either free or subject to payment, supporting a model where a professional user uploads a recipe to the store and is then paid according to how many times the recipe is downloaded. Use of a recipe can either be from a locally stored copy of the recipe, or the recipe can be downloaded from a cloud service and used in real-time.

The metadata stored in memory 52 represent the current camera device settings. When a recipe is used, the CPU 50 copies the corresponding metadata values from the template component of the recipe data file into the camera setting metadata memory locations, thereby configuring the camera settings to match those specified by the recipe. The CPU 50 also performs data conversion, as necessary, to convert the data values stored in a recipe data file into proprietary values used by the particular make and model of camera.

Camera CPU 50 is further coupled to application memory 56 where the CPU program instructions to implement the recipe based assistance tool are stored. These instructions include the basic core functions 58 to control the user interface when the assistance tool is being used; upload/download manger 60 to manage communication between the camera and sources of recipe data files; social network and on-line store protocol handlers 62 to supply the necessary login credentials and passwords needed to upload and/or download recipe data files to a particular social network site or on-line store, including handling any encryption and decryption of the login exchanges and data transfers.

In addition, if implemented, the application memory 56 may also store program instructions 64 to cause the CPU to perform image analysis, such as edge analysis or image comparator analysis to determine if, and how closely, the image currently seen in the viewfinder matches the image associated with the recipe. In this regard, it is not necessary to perform a detailed bit-by-bit comparison of the two images. Rather, a comparison of the relative exposure levels within similarly exposed regions of the respective images may suffice. In this regard, an area in shadow will have a lower relative exposure level than an area in bright sunlight. By comparing the exposure levels in respective regions of the image associated with the recipe data file to the camera's current image the CPU 50 can determine that the lighting conditions do not match and the assistance tool can then instruct the user, for example, that a better time to capture the image would be three hours later when the sun is lower on the horizon. Through such exposure level analysis the assistance tool can indirectly determine the angle of light falling on the subject, which is typically not something controllable by camera placement. A further discussion of this capability is described in connection with FIGS. 8a and 8b below.

In this regard, the system knows the geographic position of the camera as well as the time of day from GPS and clock data. Using the latitude-longitude of the current position and time of day, the CPU accesses a stored table of sun position data and thus can calculate where the sun is now in the sky and how long it will take to reach the desired position.

To provide the CPU 50 with camera location and pointing information, a digital compass or gyroscope 66, and GPS receiver 68, are coupled to the input port of the CPU. The digital compass or gyroscope 66 provides a real-time data value indicative of the pointing direction of the camera. This value may be expressed as a yaw-pitch-roll value with respect to an inertial reference frame, which may in turn be referenced to the North-South-East-West directions on the earth. The pointing direction of the camera is then ascertained by comparing the yaw-pitch-roll position of the focal plane of the image sensor to the inertial reference frame. Note that yaw, pitch and roll data provide for measurement of rotational movement about three orthogonal axes. Thus, one axis corresponds to pointing direction in with respect to North-South-East-West; another axis corresponds to degrees of inclination and declination with respect to the horizontal (one would point the lens at a 20 degree angle above a horizontal plane to photograph a bird on top of the Washington Monument, for example); a third axis corresponds to degrees of rotation about a vertical plane. Most photographs are taken with the camera rotated parallel to the horizon, although compositions at a non-horizontal angle are also possible for particular effect. In a camera having a rectangular image sensor (typical) a 90-degree rotation about this third angle of rotation changes the composition between landscape orientation, where the longer dimension is parallel to the horizon and portrait orientation where the shorter dimension is parallel to the horizon.

The GPS receiver 68 receives satellite data from the network of orbiting GPS satellites and generates a latitude-longitude-elevation data value indicative of the real-time position of the camera upon the earth's surface. Latitude and longitude data are used to determine where on a geographic map the camera is located, thus allowing the camera to determine the location of nearby points of interest defining the scene to be captured. Elevation data serves to give vantage point information: whether the camera is located on a tripod five feet above the ground, or is located in a hot air balloon fifty feet above the ground, or inches above the ground, for example. A clock module 69 provides the CPU with current date and time information.

The recipe based assistance tool further includes digital communication baseband electronics 70 coupled to an RF wireless transceiver 72. The digital communication electronics interface with the CPU 50 and modulate data packets defined by the CPU so that they may be converted to the broadcast frequency by the RF wireless transceiver 72. These components thus provide connectivity between camera 10 and a social network 74 and/or digital recipe store 76.

The recipe based assistance tool further includes audio-video electronics 78 coupled to a speaker 24, microphone 26 and display through which visual and audible instructions are provided to the camera user according to the recipe. As discussed above, the LCD display panel viewfinder 14, or optional flip out display 22, can be used as the display coupled to electronics 78.

Program Code to Create New Recipe Files

The program code comprising the core functions stored in application memory 56 define a mapping between photo recipe data files stored in memory 54 and other data locations comprising the camera setting metadata stored in memory 52 and other components, such as compass, gyroscope, GPS and optional image analysis. This mapping is bidirectional, allowing both creation of new recipe data files and use of previously created recipe data files.

When the user creates a new recipe data file for sharing with others, the CPU reads data values from the camera setting metadata memory 52 and also reads values from the digital compass or gyroscope 66, the GPS receiver 68, and optionally from the edge analysis and image comparator 64. At a user-defined time, such as when the user presses the button to release the shutter mechanism, the CPU captures these data values and stores them in memory 54 as a new photo recipe file. If the user wishes to annotate the recipe with verbal instructions, the microphone 26 coupled to audio-video electronics captures these instructions and records them as a digital sound file associated with (attached to or embedded in) the photo recipe file. If desired, the CPU can perform compression on the sound file to reduce file size.

Preferably, the recipe file so constructed also includes a pointer that links the recipe file to the digital image file captured by the digital camera. Alternatively, the recipe file can be incorporated directly into the digital image file. The photo recipe file may then be uploaded and stored in a suitable storage location, such as a cloud-based social network site or digital recipe store, where others can download and use the recipe file to create their own photograph as inspired by and instructed by the recipe.

To follow the recipe the user employs the wireless communication system within the camera to select and download a desired recipe. The user may preview different digital image files of others, stored on the social network or offered in the digital recipe store, to see examples of different types of photographs that are possible within the user's current or anticipated future location.

Once a recipe file has been downloaded, it is stored within memory 54, where the CPU maps the stored recipe data values onto the camera setting metadata, essentially reversing the data flow that was used to create the recipe data values in the first place. Some data values will map directly from recipe file to camera setting metadata: aperture, shutter speed, ISO, and color balance may typically be copied directly from recipe to camera settings. Other data values may need to be interpreted by the CPU first. For example, if the recipe calls for a 135 mm focal length and the user's camera has a maximum focal length of 105 mm, the CPU is programmed to select the 105 mm focal length and then advises the user by on-screen instruction or verbal annunciation that a longer zoom is required to match the recipe exactly, giving the additional suggestion that, if possible, the user may try getting a little closer to the subject.

Other photo recipe data values do not map onto camera metadata settings at all. Rather, they are camera context data used to instruct the user in proper placement of the camera to achieve the desired result. Camera context data include the camera pointing direction, camera position (latitude-longitude) and camera elevation.

An example of a recipe file appears below. It will be understood that the following is merely one example as there are numerous different permutations possible based on the large number of data variables involved.

Template
    Device Information
        Manufacture Name/Model Name
    Settings
        <time>56345345345UTC </time>
        docation>37.33,–122.0</location>
        <direction>270</direction>
        <aperture>0.7</aperture>
        <fspeed>0.7</fspeed>
        <zoom>5.6</zoom>
        Etc.
    Instruction
        Download and update camera settings automatically (aperture, shutter speed, zoom, etc.)
        GPS turn by turn style navigation to <location>37.33,–122.0</location>
        Present user with directions on the viewfinder
        Setup camera direction to <direction>270</direction>
        Present user with directional arrow on the viewfinder
        When the frame lined up according to the recipe, present user with green signal
        Onscreen Arrow turns green
        Click!

Program Code to Create a New Picture Based on Recipe

The CPU accesses the recipe data file within memory 54 to compose, set exposure and capture the image. Specifically, camera settings such as focal length and focus are set at this step. If the camera has a motorized zoom lens, the motorized zoom is used to set the zoom to the proper focal length. In this regard, the CPU may be programmed to automatically compensate where focal lengths do not directly correspond between recipe and a particular make and model of camera, due to differences in the sensor size. Also, as discussed above, if the user's camera cannot achieve the desired focal length, the CPU is programmed to select the best substitute and advise the user to alter his or her proximity to the subject if possible.

Setting the focus using recipe data can either be established by absolute focus command, where the focus is established at a predetermined point, or by relative command, where the focus is established using the camera's internal autofocus mechanism. In many cases, the camera's internal autofocus mechanism will provide the more photographically pleasing result. However, with some images the recipe may call for focus to be placed on a point within the field of view that is not centered within the image where the autofocus mechanism will find it. In such case, the CPU is programmed to move the autofocus region from the center to another sensing region so that focus will be effected on the desired off-center subject. If adjustment of the autofocus region is not possible for a given make or model of camera, the CPU is programmed to instruct the user to point the focal region to the off-center subject, engage the autofocus lock and then recompose the picture to the desired composition.

Composing the shot may also entail establishing a predetermined depth of field. That is, some photo recipes may call for a sharp focus from foreground to background, whereas other recipes may call for sharp focus on a nearby (or distant) subject with the remainder of the image being slightly out of focus or softly blurred. This is achieved by selectively setting the aperture to a small pupil size (e.g., f-16, f-22) if a long depth of field (sharp focus) is desired, or setting the aperture to a large pupil size (e.g., f-4, f-2.8) if a soft or blurred result is desired. However, to achieve the proper overall exposure, this in turn requires proper combination of aperture (f-stop) and shutter speed, sometimes referred to as an exposure value (EV) setting. Because aperture and shutter speed both control the amount of light that ultimately impinges on the image sensor, one can achieve a proper exposure by selection of a plurality of different aperture-shutter speed pairs. An exposure of f-8 at $\frac{1}{60}^{th}$ of a second provides the same EV setting as f-16 at $\frac{1}{30}^{th}$ of a second. The f-16—$\frac{1}{30}^{th}$ choice will provide a greater depth of field than the f-8—$\frac{1}{60}^{th}$ choice.

Thus, although selecting depth of field may be viewed as part of the "composition" of the shot, the CPU is actually programmed to establish the depth of field as part of setting the exposure. Most digital cameras today offer aperture-preferred, shutter-preferred, or automated, programmed modes of setting the exposure. The CPU is programmed to select the appropriate mode based on the recipe data, which is in turn based on what the original creator of the recipe intended.

If the original creator intended to exert control over depth of field, it is likely he or she used an aperture preferred metering mode. In this mode, the aperture is chosen (to control depth of field) allowing shutter speed to fall wherever the current lighting conditions dictate. Alternatively, if the original creator was concerned with subject motion, he or she probably used a shutter preferred metering mode. In this mode, the shutter speed is chosen (to stop fast moving action, or to blur fast moving action), allowing aperture to fall wherever the current lighting conditions dictate. It is also possible that the original creator intended to exert control over both aperture and shutter speed without regard to the camera's light metering. The original creator may have opted to take a long exposure of several seconds of a nighttime skyline view or of a fireworks display, fully intending to oversaturate the exposure to achieve a desired artistic effect. In such case, the original creator may have chosen a manual metering mode where the exact aperture setting and shutter speed duration is captured in the recipe. The CPU is programmed in such case to accept these manually established settings, notwithstanding that the camera's metering system may be calling for other values.

In some instances, the lighting conditions during a particular day may not be adequate to achieve the desired photograph without using an excessively slow shutter speed. Under these conditions, the image may be ruined due to camera shake. The CPU is programmed to detect this condition and will generate an on-screen alert or audible instruction that a tripod may be needed to steady the camera. In some situations, where the subject being photographed is within five to ten feet of the camera, a fill flash can be used to supplement the available light so that a higher shutter speed can be used. The CPU is programmed to recognize these situations and will generate an on-screen alert or audible instruction advising the user to consider using a fill flash. This recipe can be encoded to countermand a fill flash instruction if the creator deems it inappropriate.

After the shot is composed and the exposure is set, the CPU is programmed to instruct the user to press the shutter button to capture the image at step 120. Here the recipe can instruct the CPU to augment the image capture process by, for example, taking multiple exposures at different exposure settings (bracketing) or by using high dynamic range (HDR) techniques to allow a greater dynamic range to be captured. The recipe can also call for creation of panoramic shots where the user is instructed to take several photographs in different but overlapping directions, so the collection of photographs can later be stitched together into a composite panorama. The recipe can also call for use of the camera's video capture mode, where a short video of the subject is taken, allowing the user to later select the best "moment" as the final shot.

There are cameras today that use an array of lenses, each focused on an individual subject within an overall scene. This lens array makes it possible to capture a plurality of different compositions at the same time from a focal standpoint. Where such lens array is used, the recipe based assistance tool identifies the lens array combination selected by the recipe originator and incorporates that information in the recipe data file. The user of the recipe data file can then accept the recipe's focal choice, or can select a different focal point if he or she desires.

While the camera CPU can be used to make corrections to recipe data, to suit the requirements of that particular make and model of camera, one embodiment uses server-side processing to perform such data conversion. An exemplary server-side processing solution has been illustrated in FIG. 7.

The recipe data file 300 is uploaded from camera 10a via the network to server 302. The server parses the uploaded data file into exposure-related data and composition-related data. Exposure-related data are data corresponding to camera setting metadata, typically data stored within the template component of the recipe (see memory 54 of FIG. 6). Composition-related data are data that require physical movement to be performed by the camera user, such as positioning the camera at the correct location and pointing the lens in the proper direction.

The server 302 includes a translation processor 304 that converts the exposure-related data into various different camera-specific versions which are stored in a recipe database 306. For example, consider the case where the downloaded recipe file 300 was produced by a camera having a sensor size comparable to the frame of APS-C film, with a crop factor of 1.5-1.6. If the user of that recipe file uses a camera having the same sensor size, no conversion would be required. However, users of cameras having smaller sensors, such as with a crop factor of 2.0, or larger sensors equal in size to a frame of 35 mm film, will require correction in order for the CPU to select the proper lens focal length (zoom level).

The translation processor performs this sensor size conversion by accessing a camera database 308 which stores camera specific templates containing manufacturer-supplied data on the technical characteristic of that make and model of camera. Using this information, the translation processor 304 calculates the proper lens focal length (zoom level) for each different make and model of camera and stores that information in respective recipe files within database 306.

Composition-related data are handled differently. While there can be instances where user instructions will be altered based on make and model of camera, more typically, the user instructions are more dependent upon physical conditions at the site where the recipe was originally generated. In some instances, the recipe originator may wish to give verbal instructions for inclusion in the recipe. While digitally recorded audio files can be included in the recipe, these can sometimes become large and difficult to review quickly. To address this, the server 302 includes a speech to text processor 310 which converts spoken recipe instructions into text that can be more suitably displayed on the viewfinder display. Language conversion can also be performed within the speech to text processor, making it possible to provide user-created recipe instructions in multiple human languages. These converted text files become part of the recipe as stored in database 306. If desired, the database 306 can be replicated according to different human languages, so that each recipe is stored with a different language. In this way, a given user can select and download the language that he or she prefers.

When the user of a second camera 10b downloads the recipe file, the server ascertains the make and model of camera 10b and serves it the appropriate recipe file selected from database 306.

While conversion of lens focal length data has been described here, it will be understood that a comparable process is performed to adapt and convert other exposure-related data to accommodate different makes and models of camera.

In some instances, it may simply not be possible to make a suitable data conversion. A super wide angle lens may be called for in the recipe and the recipe user's camera may simply be unable to accommodate that focal length. In such case, the server provides a visual or audible message to the user that the selected template is incompatible with the user's camera. This message is preferably sent before the user downloads the template.

In implementing a server-side solution, the recipe may be selected first according to a model-based recommendation and second according to a conversion data recommendation. Thus, if the user cannot find his or her own camera model listed in the recipe list, a conversion can be used.

Many of the audible and visual instructions provided to the user are dynamically generated in real-time based on current photographic conditions. By way of illustration how the recipe based assistance tool accomplishes this, refer to FIGS. 8a and 8b which show how real-time instructions are generated based on current lighting conditions. Generation of other real-time instructions are handled in a similar fashion.

Figure 8A:
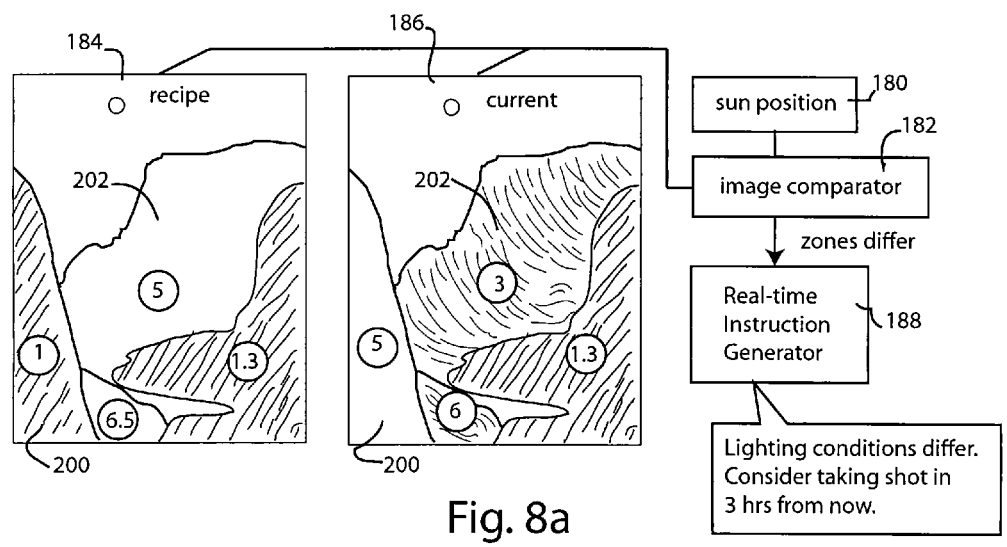
FIGS. 8a and 8b illustrate how real-time instructions are generated based on image comparator operation.
Figure 8B:
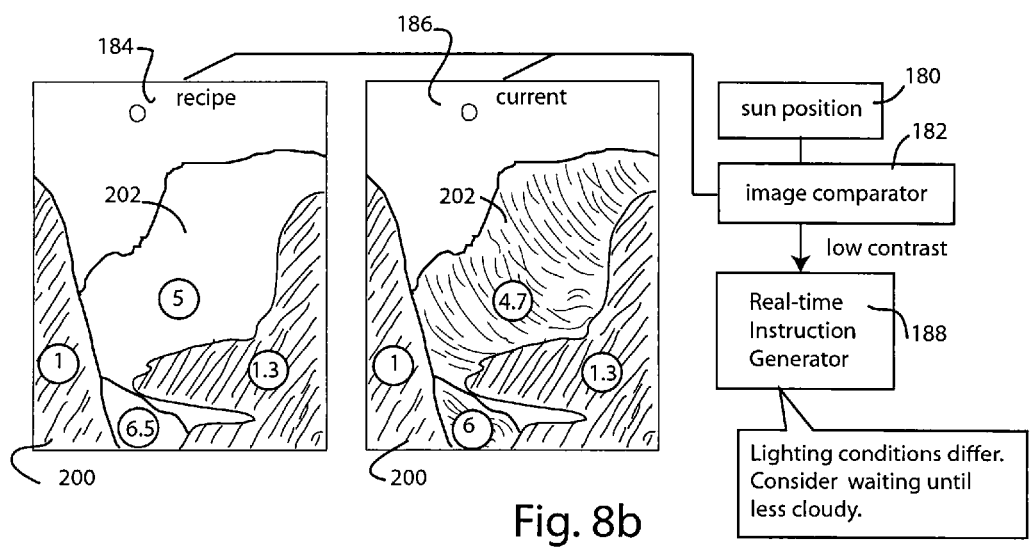

As shown in FIGS. 8a and 8b, the sun position is calculated by the CPU as at 180 using a sun position algorithm that uses the camera's current latitude and longitude and data and time information to look up from a look up table either stored within application memory 56 or obtained from a data source via the network. The CPU then performs an image comparator process 182 that compares the image 184 associated with the recipe data file with the camera's current image 186 within the viewfinder. The comparator first assesses the current sun position and compares it with the sun position which existed when the recipe data was captured. In this regard, the recipe can either record the sun position itself, or it can record the time of day and date along with the latitude and longitude information, and the comparator can calculate the recipe sun position at the time the recipe is used.

In some instances, the difference in sun position may not greatly affect the results of the shot. In such case, the comparator simply ignores such sun position discrepancy and allows the user to take the shot as presently seen in the viewfinder. To make the assessment whether sun position discrepancy will or will not affect the shot, the comparator performs a lighting level assessment across different regions of the respective images.

More specifically, the comparator process averages the amount of light falling on different regions within the respective images, subdividing the illumination into different exposure zones ranging from zone 0 (full black, no detail) to zone 10 (full white, no detail). Then by comparing regions, the image comparator process assesses whether the two compositions compare favorably or not.

As illustrated in FIG. 8a, when the image comparator assesses the lighting patterns as seen through the viewfinder 186 with those of the original recipe 184, the regions of the respective regions are not comparable. For example, region 200 within image 184 is illuminated by an amount calculated to fall in zone 1 (dark black). Region 202 within image 184 falls in zone 5 (middle grey, four f-stops lighter than region 200). In comparison, region 200 within image 184 falls into zone 5, whereas region 202 falls into zone 3 (two f-stops darker than region 200). The image comparator detects that the relative ratios between like regions within the respective images are not the same. That is, region 202 was lighter than region 200 in image 184, whereas region 202 was darker than region 200 in image 186. Because the relative lighting patterns are different between the two images, the comparator 182 issues a decision that the "zones differ." This decision along with the sun position difference information is fed to the real-time instruction generator 188, implemented by CPU 50, which generates an on-screen or synthesized text message that "Lighting conditions differ. Consider taking shot 3 hours from now."

In some instances, the lighting levels between the recipe image and the current viewfinder image may be different, although the relative levels within regions of the images may be roughly the same. This has been illustrated in FIG. 8b. Region 200 within each of images 184 and 186 are the same (zone 1). While region 202 of image 186 is darker than the corresponding region 202 of image 184 (zone 4.7 instead of zone 5), the relative lighting composition is the same between these two images. Essentially, the sun position for image 186 is the same as that for image 184, although the illumination provided in image 186 is less intense. Image 186 has less contrast, compared with image 184, indicating perhaps that the sun is partially obscured by clouds or haze.

Having detected this low contrast condition, the image comparator issues a "low contrast" decision to the real-time instruction generator 188, which then generates an on-screen or synthesized text message that "Lighting conditions differ. Consider waiting until less cloudy."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A digital camera comprising:
a digital image capturing system having an image sensor that defines a focal plane and having at least one exposure adjusting mechanism that stores an associated device setting value in a processor-readable non-transitory memory and having a release mechanism that captures an image to the image sensor in response to user manipulation;
a camera location sensor that provides location data indicative of the position of the camera relative to a predetermined reference frame;
a camera pointing direction sensor that provides direction data indicative of the orientation of the focal plane relative to a predetermined reference frame;
a recipe based assistance tool comprising a recipe generating processor that reads the device setting value, the location data and the direction data, analyzes the captured image to generate data indicative of sun position and generates a recipe data file that includes the data indicative of sun position in response to manipulation of the release mechanism; and
a network communication device adapted to upload the captured image and the recipe data file in association with the captured image to a network-based storage location for download by others.

2. The digital camera of claim 1 wherein said processor automatically generates an instructional component, comprising part of the recipe data file, for presenting camera positioning and aiming information to a camera user upon downloading of the recipe data file into the camera of the another user.

3. The digital camera of claim 1 wherein said recipe data file comprises a template component representing device settings to adjust light capturing properties of a camera and an instructions component representing user instructions to effect physical positioning and aiming of a camera.

4. The digital camera of claim 1 wherein the camera location sensor includes a GPS receiver.

5. The digital camera of claim 1 wherein the camera pointing direction sensor includes a digital compass or gyroscope.

6. The digital camera of claim 1 wherein the camera location sensor provides location data as latitude-longitude data relative to the surface of the earth.

7. The digital camera of claim 1 wherein the camera pointing direction sensor provides direction data as angular offset data relative to an inertial reference frame.

8. The digital camera of claim 1 wherein the camera pointing direction sensor provides direction data with respect to three orthogonal axes.

9. The digital camera of claim 1 further comprising a camera CPU coupled to the digital image capturing system for controlling operation thereof, and wherein the recipe generating processor is implemented using the camera CPU.

10. The digital camera of claim 1 further comprising a microphone coupled to the recipe based assistance tool and being operative to capture and record verbal instructions from a user of the digital camera, the verbal instructions being associated with the recipe data file by the recipe generating processor.

11. The digital camera of claim 1 wherein the network communication device includes a social network and store protocol handler adapted to authenticate the digital camera to a network-based storage location.

12. The digital camera of claim 1 further comprising a zoom lens having adjustable focal length and a focal length sensor that stores a focal length setting value in said processor-readable non-transitory memory, and wherein the recipe generating processor reads the focal length setting value and uses it in generating the recipe data file.

13. The digital camera of claim 1 wherein said digital image capturing system includes a color balance compensator that adjusts the relative intensity levels for each of the primary colors to improve white rendering and that stores a color balance setting value in the processor-readable non-transitory memory, and wherein the recipe generating processor reads the color balance setting value and uses it in generating the recipe data file.

14. The digital camera of claim 1 wherein said digital image capturing system stores the captured image as a digital image file and wherein the recipe generating processor includes the digital image file with the recipe data file for uploading to the network-based storage location.

15. A digital camera comprising:
a digital image capturing system having an image sensor that defines a focal plane and having at least one exposure adjusting mechanism responsive to a device setting value stored in a processor-readable non-transitory memory;
a network communication device adapted to receive a recipe data file from a network-based storage location;
a camera location sensor that provides location data indicative of the current position of the camera relative to a predetermined reference frame;
a camera pointing direction sensor that provides direction data indicative of the current orientation of the focal plane relative to a predetermined reference frame; and
a recipe based assistance tool comprising a recipe utilizing processor that presents a user with an interface to search for and select a specific recipe and that reads the recipe data file for the selected specific recipe and uses information contained within said file to adjust the device setting value,
the recipe utilizing processor being further operative to use information contained within the file to compare with the location data and the direction data and to generate an instructional message to the user.

16. The digital camera of claim 15 wherein the instructional message comprises camera positioning and aiming information.

17. The digital camera of claim 15 further comprising an audio playback system coupled to the recipe utilizing processor and wherein said instructional message is audibly presented using the audio playback system.

18. The digital camera of claim 15 further comprising a video playback system including a display and wherein said instructional message is visually presented using the video playback system.

19. The digital camera of claim 15 further comprising a video playback system, including a viewfinder display and wherein said instructional message is visually presented on the viewfinder display using the video playback system.

20. The digital camera of claim 15 wherein the camera location sensor includes a GPS receiver.

21. The digital camera of claim 15 wherein the camera pointing direction sensor includes a digital compass or gyroscope.

22. The digital camera of claim 15 wherein the camera location sensor provides location data as latitude-longitude data relative to the surface of the earth.

23. The digital camera of claim 15 wherein the camera pointing direction sensor provides direction data as angular offset data relative to an inertial reference frame.

24. The digital camera of claim 15 wherein the camera pointing direction sensor provides direction data with respect to three orthogonal axes.

25. The digital camera of claim 15 further comprising a camera CPU coupled to the digital image capturing system for controlling operation thereof, and wherein the recipe utilizing processor is implemented using the camera CPU.

26. The digital camera of claim 15 wherein the network communication device includes a social network and store protocol handler adapted to authenticate the digital camera to a network-based storage location.

27. The digital camera of claim 15 further comprising a zoom lens having adjustable focal length controlled by a focal length setting value stored in said processor-readable non-transitory memory, and wherein the recipe utilizing processor reads focal length setting information from the recipe data file and uses it to set the focal length setting value and thereby automatically controls the focal length of the zoom lens.

28. The digital camera of claim 15 wherein said digital image capturing system includes a color balance compensator that adjusts the relative intensity levels for each of the primary colors to improve white rendering based on a color balance setting value stored in the processor-readable non-transitory memory, and wherein the recipe utilizing processor reads the color balance setting value and uses it to set the color balance setting value.

29. A digital camera comprising:
a digital image capturing system having an image sensor that defines a focal plane and having at least one exposure adjusting mechanism responsive to a device setting value stored in a processor-readable non-transitory memory;
a network communication device adapted to receive a recipe data file from a network-based storage location;
a camera location sensor that provides location data indicative of the current position of the camera relative to a predetermined reference frame;
a camera pointing direction sensor that provides direction data indicative of the current orientation of the focal plane relative to a predetermined reference frame; and
a recipe based assistance tool comprising a recipe utilizing processor that reads the recipe data file and uses information contained within said file to adjust the device setting value,
the recipe utilizing processor being further operative to use information contained within the file to compare with the location data and the direction data and to generate an instructional message to a user,
wherein the digital camera includes a viewfinder adapted to display a view currently visible by the image sensor, the digital camera further comprising an image comparator processor that compares the view currently visible in the viewfinder with a digital image associated with the recipe data file and that generates the instructional message at least in part upon said comparison.

30. The digital camera of claim 29 wherein the instructional message comprises camera positioning and aiming information.

31. The digital camera of claim 29 further comprising an audio playback system coupled to the recipe utilizing processor and wherein said instructional message is audibly presented using the audio playback system.

32. The digital camera of claim 29 further comprising a video playback system including a display and wherein said instructional message is visually presented using the video playback system.

33. The digital camera of claim 29 further comprising a video playback system, including a viewfinder display and wherein said instructional message is visually presented on the viewfinder display using the video playback system.

34. The digital camera of claim 29 wherein the camera location sensor includes a GPS receiver.

35. The digital camera of claim 29 wherein the camera pointing direction sensor includes a digital compass or gyroscope.

36. The digital camera of claim 29 wherein the camera location sensor provides location data as latitude-longitude data relative to the surface of the earth.

37. The digital camera of claim 29 wherein the camera pointing direction sensor provides direction data as angular offset data relative to an inertial reference frame.

38. The digital camera of claim 29 wherein the camera pointing direction sensor provides direction data with respect to three orthogonal axes.

39. The digital camera of claim 29 further comprising a camera CPU coupled to the digital image capturing system for controlling operation thereof, and wherein the recipe utilizing processor is implemented using the camera CPU.

40. The digital camera of claim 29 wherein the network communication device includes a social network and store protocol handler adapted to authenticate the digital camera to a network-based storage location.

41. The digital camera of claim 29 further comprising a zoom lens having adjustable focal length controlled by a focal length setting value stored in said processor-readable non-transitory memory, and wherein the recipe utilizing processor reads focal length setting information from the recipe data file and uses it to set the focal length setting value and thereby automatically controls the focal length of the zoom lens.

42. The digital camera of claim 29 wherein said digital image capturing system includes a color balance compensator that adjusts the relative intensity levels for each of the primary colors to improve white rendering based on a color balance setting value stored in the processor-readable non-transitory memory, and wherein the recipe utilizing processor reads the color balance setting value and uses it to set the color balance setting value.

* * * * *